United States Patent [19]
Jensen et al.

[11] 3,936,825
[45] Feb. 3, 1976

[54] COMBINED CONTIGUOUS FILTER AND ACCELERATION AND VELOCITY ANALYZER FOR RADAR

[75] Inventors: Garold K. Jensen, Alexandria, Va.; James E. McGeogh, Silver Spring, Md.

[73] Assignee: The United States of Americas as represented by the Secretary of the Navy, Washington, D.C.

[22] Filed: June 16, 1971

[21] Appl. No.: 154,234

[52] U.S. Cl. ............................................... 343/9
[51] Int. Cl.² ...................................... G01S 9/44
[58] Field of Search ........................ 343/7.7, 8, 9

[56] References Cited
UNITED STATES PATENTS

| | | | |
|---|---|---|---|
| 3,885,240 | 5/1975 | Jensen | 343/9 |
| 3,898,656 | 8/1975 | Jensen | 343/9 X |
| 3,898,657 | 8/1975 | Jensen | 343/8 |
| 3,989,658 | 8/1975 | Jensen et al. | 343/8 |
| 3,898,659 | 8/1975 | Jensen et al. | 343/8 |
| 3,900,869 | 8/1975 | Jensen | 343/7.7 |
| 3,900,872 | 8/1975 | Jensen et al. | 343/9 |
| 3,905,034 | 9/1975 | Jensen et al. | 343/9 |

*Primary Examiner*—T. H. Tubbesing
*Attorney, Agent, or Firm*—R. S. Sciascia; P. Schneider

[57] ABSTRACT

A single filter to replace a set of parallel filters in an O-T-H radar comprising a prelimiting filter connected to amplifying and limiting means and quenching means for shorting out said prelimiting filter at appropriate times. The prelimiting filter is connected to receive the output of the mixer of one range bin of the velocity-and-acceleration analyzer of the radar and the predetection filter of the analyzer receives the output of the amplifying and limiting means. The quenching means also receives the output of the amplifying and limiting means and provides a quenching signal to the predetection filter.

5 Claims, 5 Drawing Figures

INVENTORS
GAROLD K. JENSEN
JAMES E. McGEOGH

Philip Schneider
Arthur L. Branning ATTORNEYS

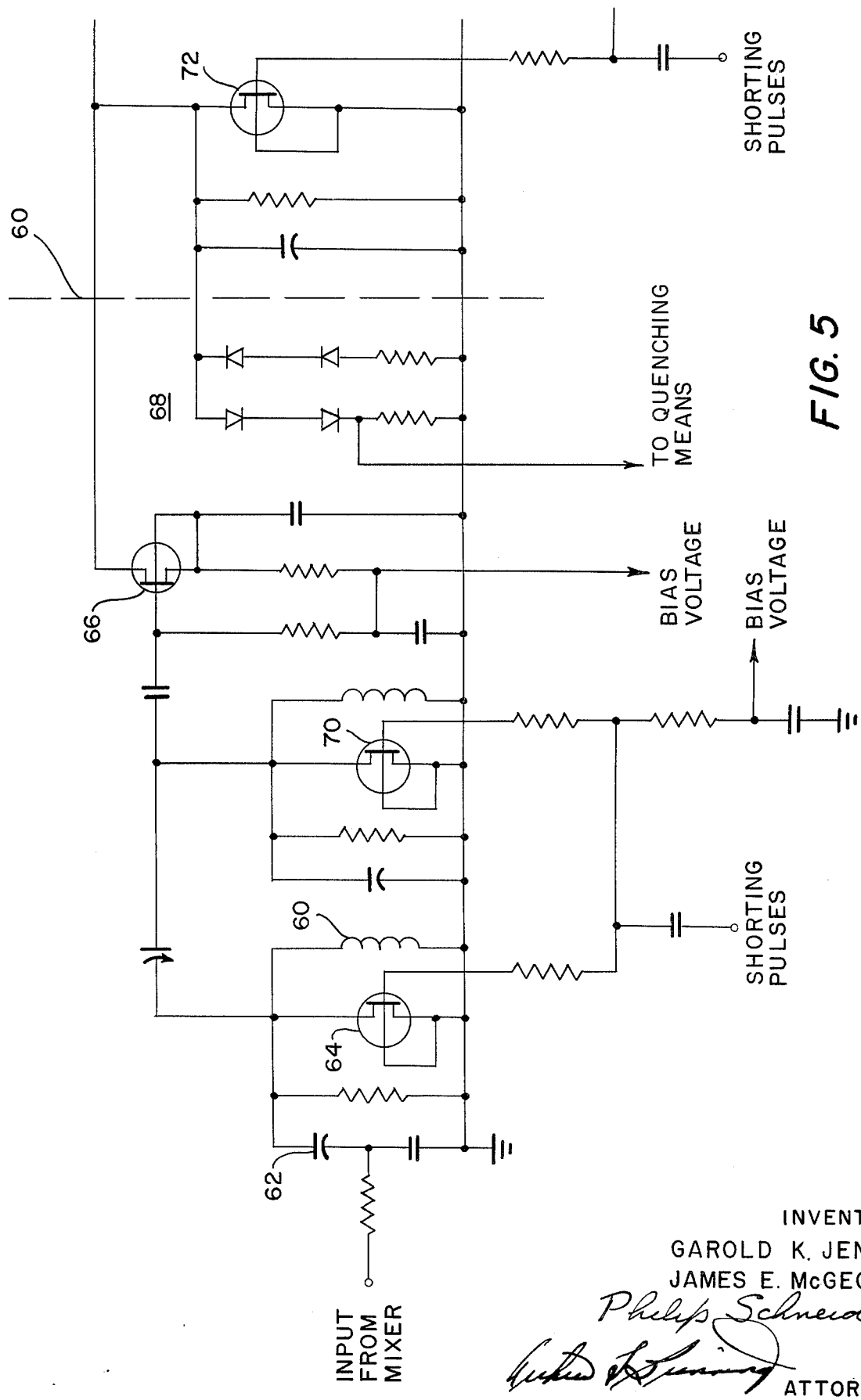

COMBINED CONTIGUOUS FILTER AND ACCELERATION AND VELOCITY ANALYZER FOR RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a filtering system and especially to a single filter which can be used in place of the plural contiguous filter channels used in over-the-horizon radar.

Over-the-horizon radar as described in copending U.S. Patent applications Ser. No. 649,791, filed 6/27/67, now U.S. Pat. No. 3,885,240, and Ser. No. 285,555, filed 5/31/63, now U.S. Pat. No. 3,905,034, is used to detect various types of moving objects which impart doppler frequencies to the reflections corresponding to the velocity and acceleration characteristics of the targets. The received signals cover a range of doppler frequencies starting at zero Hz. The system that has been used in the past to detect echoes in this type of radar record the received signal in a storage memory and then to take the stored signals and pass them through sets of paralleled contiguous filters before coupling them to a velocity-and-acceleration analyzer which employs different frequency-swept signals to endeavor to match the frequency characteristics of any echo which has been received. Each parallel filter comprises two bandpass filters, an amplifier and a limiter, and may include a gate. Thus, the filter system employs an enormous amount of hardware.

SUMMARY OF THE INVENTION

The invention replaces each set of paralleled filters by a single filter which is placed between the mixer and the predetection filter of each range bin velocity-and-acceleration analyzer. The invention comprises a prelimiting filter in series with amplifying and limiting means whose output is fed back to quenching means. The output of the latter is fed to the prelimiting filter as a filter-shorting input.

OBJECTS OF THE INVENTION

An object of the invention is to provide a single filter in place of the present set of paralleled contiguous filters used in an O-T-H radar to cover the doppler frequency bandwidth.

Other objects, advantages and novel features of the invention will become apparent from the following detailed description of the invention when considered in conjunction with the accompanying drawings.

BRIEF DESCRIPTION OF THE DRAWINGS

FIG. 5 is a schematic illustrating one stage of the prelimiting filter.

DETAILED DESCRIPTION OF THE INVENTION

Figures 1, 2:
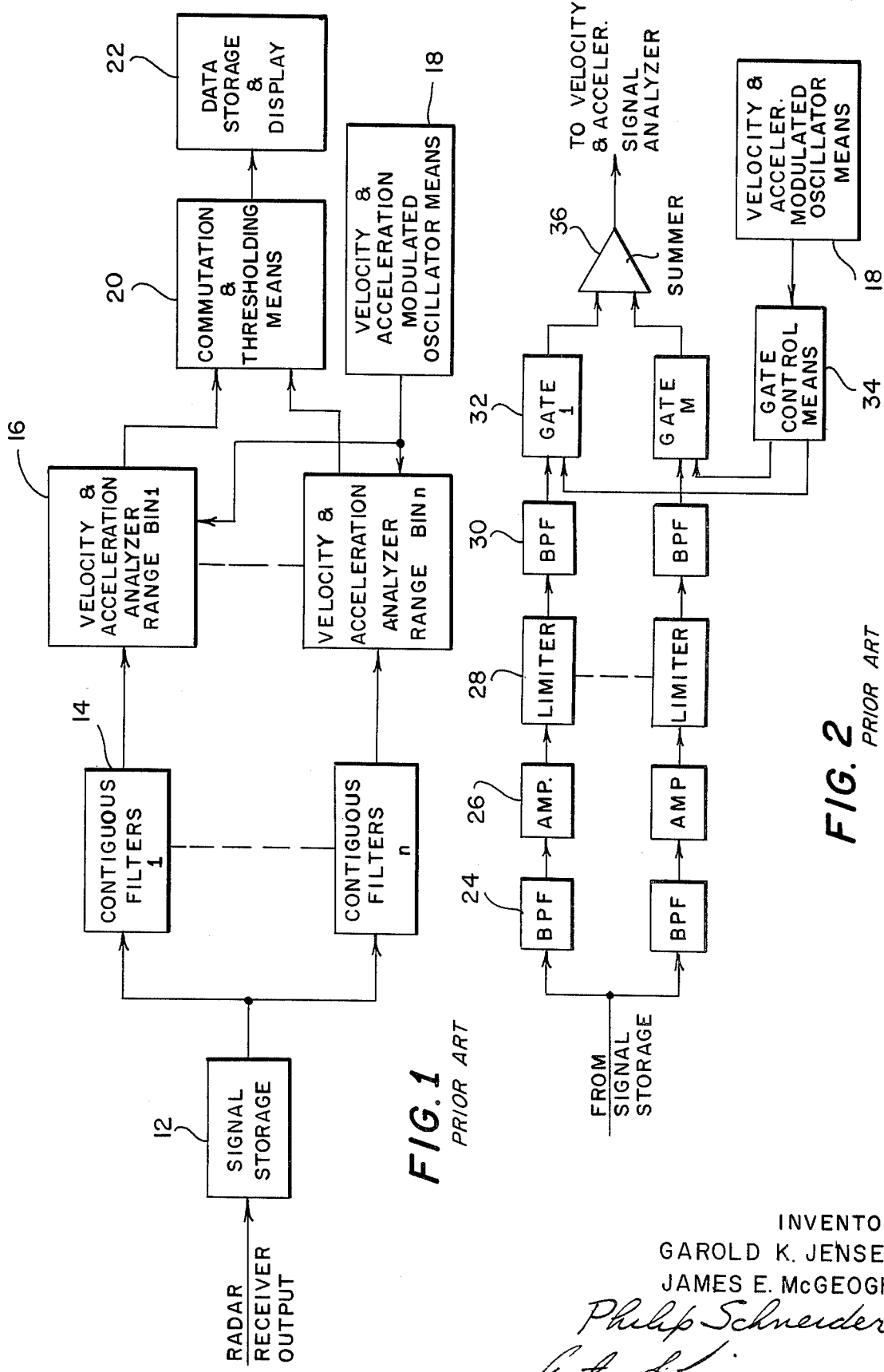
FIG. 1 is a block diagram showing a parallel range type velocity, acceleration and range analyzer for an O-T-H radar.
FIG. 2 is a block diagram showing the components of one of the contiguous filters.

FIG. 1 shows a parallel range type velocity, acceleration and range analyzer which is used with an O-T-H radar. The radar receiver output is stored and then fed to a set of paralleled contiguous filters 14, each set covering the range of possible doppler frequencies which may be received from moving-target echoes. The output of each individual set of contiguous filters 14 is fed to a velocity-and-acceleration analyzer 16 where the return signals at a given range are swept by voltages which are swept in frequency at different rates to try to match the frequency-time characteristic of any echoes. Matched signals pass through the commutation and thresholding means 20 and thence to data storage and display means 22 which stores the signals and then displays them, usually on a scope.

Each set of contiguous filters, e.g., No. 1, consist of a set of parallel filter channels, as shown in FIG. 2. Thus, the entire doppler-frequency bandwidth may be divided into contiguous channels (perhaps 10, or more). Each channel contains a bandpass filter (BPF) 24, an amplifier 26, a limiter 28, another BPF 30, and a gate 32. A summer 36, gate control means 34 and velocity-and-acceleration modulated oscillator means 18 constitute associated equipment, the latter two means being common for all contiguous filters.

Figure 3:
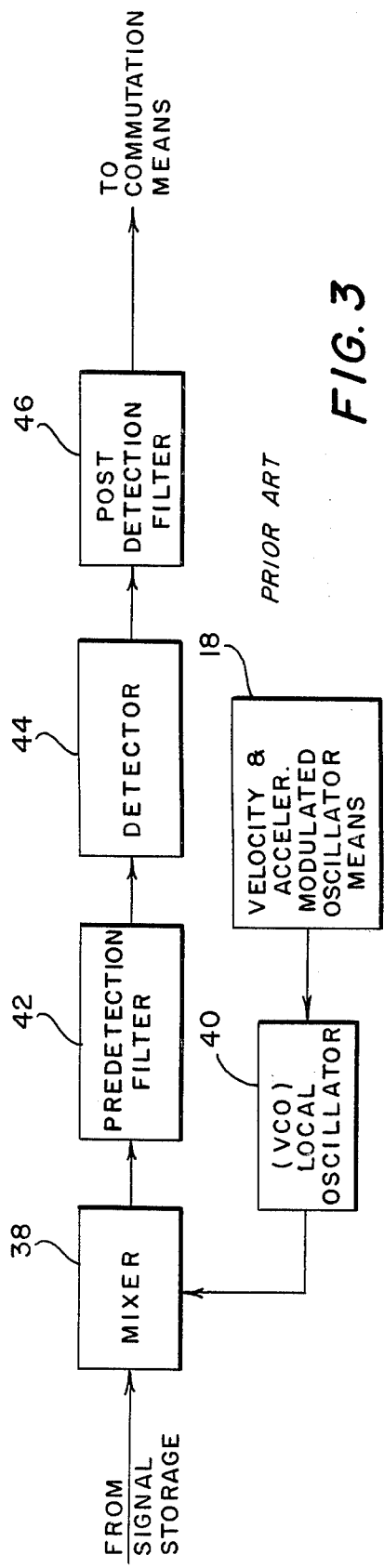
FIG. 3 is a block diagram showing the components of one of the velocity-and-accerleration analzyer range bins.
Figure 4:
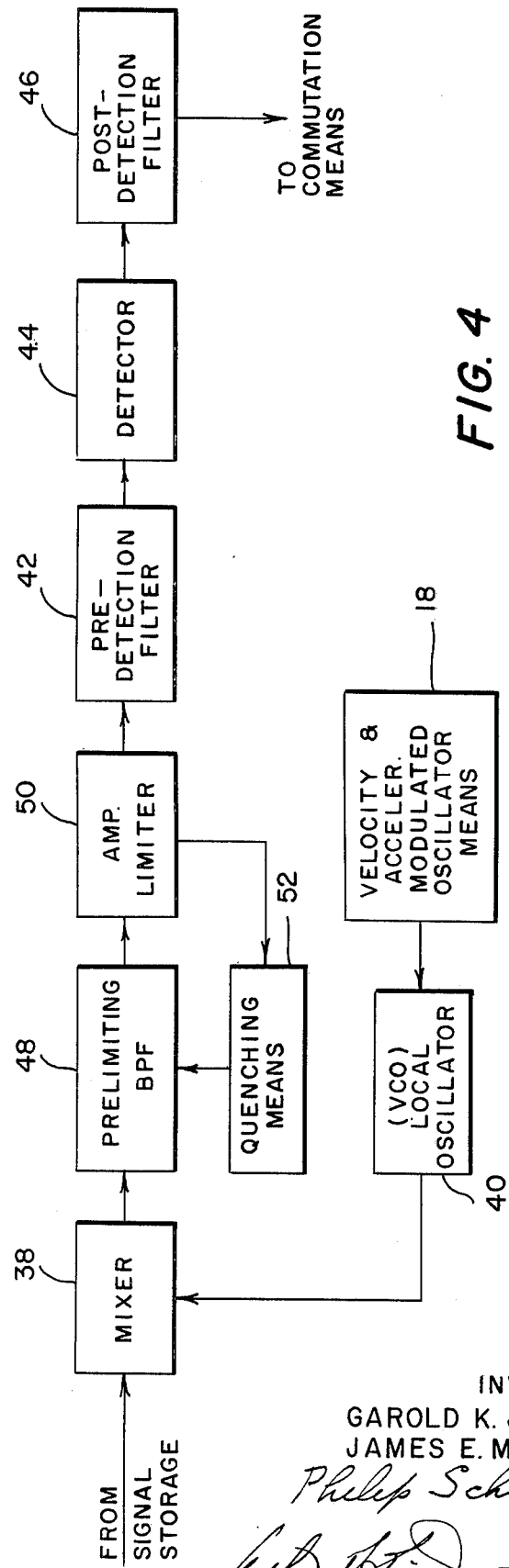
FIG. 4 is a block diagram showing an embodiment of the invention.

Each range bin 16 of the velocity-and-acceleration analyzer comprises, as shown in FIG. 3, a local oscillator 40, preferably a voltage-controlled oscillator, which is swept by the output signal of the velocity-and-acceleration modulated oscillator means 18. Velocity is swept in a series of constant-frequency steps, each of which lasts an equal interval of time, $t$. Acceleration is swept by a series of frequency versus time sawtoooth waves in each time interval, $t$, each succeeding wave being of increasing slope.

The velocity-and-acceleration signals are mixed with the incoming signals from the signal memory or storage, sent through a predetection BPF 42, detected by an envelope detector 44 and sent through a post-detection filter 46, which has a narrower pass band than the predetection filter.

It has been found that a single BPF 48, hereinafter called a prelimiting filter, can be employed between the mixer 38 and the predetection filter 42 in place of the parallel filter channels of a contiguous mixer. This is because only one filter channel is used at a given time. Thus, one channel can be sequenced through the doppler bandwidth. This single filter channel is placed after the mixer in the velocity-and-acceleration analyzer and the local oscillator sequences the doppler band past the fixed-frequency filter 48. The bandwidth of the prelimiting filter 48 must be sufficiently wide to preserve the wide spectrum of non-matching signals; non-matching signals will be truncated. The bandwidth of this filter may be between one-quarter and one-tenth of the doppler bandwidth depending on the highest acceleration to be covered. The shape factor should be about 1.25 for good discernibility.

Some typical figures may be given at this point. The frequencies of the incoming signals from the signal storage may range between 0.4 and 3.75 MHz. The local oscillator then would sweep from 13.4 to 16.75 MHz. This provides a fixed-frequency output from the mixer of 13 MHz so that the center frequency of the prelimiting filter 48 is 13 MHz.

The prelimiting filter output is passed through an amplifier and limiter 50 to the predetection filter 42 of the velocity-and-acceleration analyzer. The prelimiting filter 48 has to be quenched because its decay time is significant compared to the time needed to sweep out one filter bandwidth at high accelerations and the filter should be down to 100 db in a 120 db system before sweeping to the next section of the doppler band.

Quenching can be accomplished as shown. Whenever a signal over the limit level appears at the limiter, this can be sensed and a pulse generated to short out the poles of the filter. This can be repeated as long as a large signal exists, the rate being determined by the filter delay. When no signal large enough to cause limiting exists, the channel passes signals. It also passes signals between quench pulses. A quenching pulse is also generated at the end of each sweep period to clear the filter for the next sweeping period.

The prelimiting filter may consist of a series of stages, as shown in FIG. 5. The circuit in FIG. 5 includes the amplifying and limiting functions as well as filtering. The stages can be said to repeat after the dashed line 60. Each filter section consists of a transformer 60 tuned by a capacitor 62. An FET gate 64 is placed across the transformer 62 and is normally biased so that it does not conduct. When a shorting pulse is applied to the gate electrode of the FET 64, it becomes conductive and shorts out the tuned transformer.

The amplifying function is provided by FET 66 in a conventional amplifying circuit.

The limiting function is provided by the four diodes 68 at the input to gating FET 72.

The stages of the filter cause signal delay and therefore are not shorted out simultaneously but serially, with a delay of about 0.4 microseconds between stages.

Combining the functions of contiguous filtering and acceleration-and-velocity processing results in about a two-to-one reduction in hardware.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In each velocity-and-acceleration analyzer of an O-T-H radar of the parallel range bin type, each said analyzer comprising a mixer, a local oscillator, a velocity-and-acceleration modulated oscillator means, a predetection filter, a detector and a post-detection filter, a single filter means comprising:
   prelimiting filter means connected to receive the output of said mixer for filtering; and
   amplifying and limiting means connected to receive the output of said prelimiting filter for amplifying and limiting the output of said prelimiting filter and for providing its output to said predetection filter,
   said velocity-and-acceleration modulated oscillator means driving said local oscillator to provide sets of frequency-swept signals to said mixer which serially sweep through narrow contiguous frequency channels, the complete set of frequency channels covering the entire doppler frequency bandwidth.

2. Apparatus as set forth in claim 1, wherein said prelimiting filter has a bandwidth sufficiently large to preserve the wide spectrum of incoming signals which are not matched with the frequency sweeps of the signal output of said local oscillator.

3. Apparatus as set forth in claim 2, further including quenching means connected to said amplifying and limiting means for providing a signal to short out said prelimiting filter means when the input to said amplifying and limiting means is above a predetermined level and also at certain predetermined times, the output of said quenching means being connected as an input to said prelimiting filter.

4. Apparatus as set forth in claim 1, wherein said predetection filter comprises at least one stage comprising a tuned transformer and an FET gate connected across the terminals of said tuned transformer.

5. Apparatus as set forth in claim 4, further including quenching means connected to said amplifying and limiting means for providing a signal to short out said prelimiting filter means when the input to said amplifying and limiting means is above a predetermined level and also at certain predetermined times, the output of said quenching means being connected to the gate electrode of said FET.

* * * * *